United States Patent Office 3,803,168
Patented Apr. 9, 1974

3,803,168
DISPERSIBLE ANTHRAQUINONE DYESTUFFS
Hans-Peter Kolliker, Muenchenstein, Alfred Staub, Binningen, and Peter Hindermann, Bottmingen, Switzerland, assignors to Ciba-Geigy AG, Basel, Switzerland
No Drawing. Continuation-in-part of application Ser. No. 24,810, Apr. 1, 1970, now Patent No. 3,689,510. This application Jan. 21, 1972, Ser. No. 219,853
Claims priority, application Switzerland, Apr. 2, 1969, 5,026/69
Int. Cl. C07d 27/52
U.S. Cl. 260—326 C                    4 Claims

ABSTRACT OF THE DISCLOSURE

Difficulty water-soluble anthraquinone dyestuffs free from water-solubilizing groups which dissociate acid in water bearing in at least one β-position, either directly or by way of a bridging member, the grouping —Y—O—COOR, wherein Y represents an alkylene group, optionally substituted by a hydroxyl group and R represents an optionally substituted aliphatic, cycloaliphatic or aromatic radical; these dyestuffs being suited particularly for the dyeing of synthetic organic fibers, especially polyethylene glycol terephthalate fibers, affording dyeings on these fibers which have good fastness properties and especially good fastness to light and sublimation.

---

This is a continuation-in-part application of U.S. application, Ser. 24,810, filed Apr. 1, 1970, now U.S. Pat. No. 3,689,510.

The present invention relates to sparingly water-soluble anthraquinone dyestuffs, usable as dispersion dyestuffs, to processes for their production, to the use of these anthraquinone dyestuffs for the dyeing or printing of synthetic organic textile fibres, especially textile fibres made from linear polyesters of aromatic polycarboxylic acid with polyfunctional alcohols, or made from cellulose esters and, the textile fibres dyed or printed with said dyestuffs.

It has been found that difficulty water-soluble anthraquinone dyestuffs being free from water-solubilizing groups dissociating acid in water and corresponding to the Formula I,

A—Y—O—COOR    (I)

are characterized by particularly advantageous properties e.g. good affinity on polyester fibres combined with good fastness to light and sublimation of the dyeings produced therewith.

In the above Formula I

A represents the radical of an anthraquinone dyestuff which is linked with Y, in at least one β-position, either directly or by way of a bridging member,
Y represents an alkylene group, optionally substituted by a hydroxyl group, and
R represents an optionally substituted aliphatic, cycloaliphatic or aromatic radical.

The anthraquinone dyestuffs of Formula I are obtained by condensing an anthraquinone compound of the Formula II,

A—Y—OH    (II)

wherein A and Y have the meaning given under Formula I, with a halogeno formic acid ester of the Formula III, Hal—COOR    (III)

wherein Hal represents chlorine or bromine and R has the meaning given under Formula I.

The starting materials are so chosen that the obtained anthraquinone dyestuff contain no water-solubilizing groups dissociating acid in water, i.e. it contains, e.g. no sulphonic acid groups, carboxylic acid groups or phosphoric acid groups.

The anthraquinone compounds, usable as starting materials and containing, in at least one β-position, a hydroxyalkyl radical bound either directly or by way of a bridging member to the anthraquinone neuclus, can belong to the series of the actual anthraquinonyl compounds as well as to that of the higher condensed derivatives, e.g. to the group of the anthraquinonyl or anthrapyrimidinyl compounds.

The anthraquinone nucleus can contain, in addition to the substituents —Y—O—COOR in β-position, further substituents, e.g. primary amino groups or secondary amino groups which can be substituted by a lower alkyl group such as the methyl, isopropyl or sek. butyl group, a cycloalkyl group such as the cyclohexyl group, a mono- or polynuclear aryl group, e.g. phenyl, chlorophenyl, methylphenyl such as the toluyl or 2,4,6-trimethylphenyl group, methoxyphenyl, phenoxyphenyl or phenylazophenyl group as well as hydroxy, cyano or nitro groups, or halogens such as fluorine, chlorine or bromine.

The anthraquinone radical A can be bound direct to Y or by way of a bivalent or trivalent bridging member. Bivalent bridging members can be double-bonding atoms such as oxygen or sulphur, or double-bonding groups. Suitable double-bonding groups are, e.g. those containing heteroatoms, e.g. a —COO—, —CONH—, —(O—alkylene)$_{1-3}$—O—, —S—alkylene—O—, —O—alkylene—O—phenylene—, —phenylene—O—, —O—phenylene—, —O—phenylene—O—, —O—alkylene—O—phenylene—O—, —S—phenylene—O—, —NH—phenylene—, —NH—phenylene—O—, or —COO—alkylene—O—, the —SO$_2$—, —SO$_2$—O—, —SO$_2$—NH—SO$_2$—,

—O—phenylene—SO$_2$NH— or

—S—phenylene—SO$_2$NH— group (whereby R' denotes hydrogen or a lower alkyl radical, the alkylene group has at most 4 carbon atoms and the phenylene group may be substituted by halogen such as chlorine, or lower alkyl groups). Suitable as triavlent bridging member is, in particular, the o-dicarboxylic acid imide group.

The alkylene group Y contains 1–6 carbon atoms and preferably at most 4 carbon atoms and can be straight-chained or branched; in the former case it is preferably the 1,2-ethylene or 1,3-propylene group, in the latter case it is the 2-methyl-1,3-propylene or 2,2-dimethyl-1,3-propylene group. If the alkylene group Y is substituted by a hydroxyl group, it represents especially a 2-hydroxyl-1,3-propylene group.

If R represents an aliphatic radical, then it is, e.g. a straight or branch-chained, optionally substituted alkyl or alkenyl group (in the latter case especially a Δ$_2$-alkenyl group) having preferably up to 5 carbon atoms. As substituents, these aliphatic radicals, especially the alkyl group, can contain, e.g. halogens such as chlorine or bromine, or a lower alkoxy group as well as a carbocyclic ring having, in particular, aromatic character such as the phenyl radical, or heterocyclic rings such as the thienyl-(2)-, furyl-(2)- or tetrahydrofuryl-(2)-radical.

Cycloaliphatic radicals denoted by R are, e.g. cycloalkyl groups having preferably 5- or 6-membered rings and especially the cyclohexyl or methylcyclohexyl group.

When R represents an aromatic radical, then this radical preferably belongs to the benzene series; it can contain usual non-ionogenic ring substituents. Such substituents are, e.g. halogens such as fluorine, chlorine or bromine, $C_1$-$C_4$-alkoxy or lower $C_1$-$C_4$-alkyl groups, preferably chlorine or methyl groups.

Starting materials of the Formula II are for the most part known or they can be produced by methods known per se.

Anthraquinone compounds of the Formula II, in which the radical A is bound to Y by way of oxygen, sulphur, an —O—alkylene—O—,

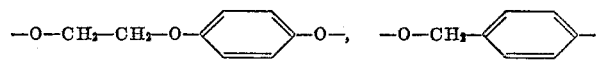

—O—alkylene—cycloalkylene—alkylene—O—group, can be obtained, e.g. using the process of the German Pat. 1,209,680 or of the British Pat. 974,404, e.g. by reacting an anthraquinone compound of the Formula IV, $$A'—W \qquad (IV)$$

wherein

A' represents a β-anthraquinonyl radical, and
W represents halogen, the sulphonic acid group or a phenoxy group, with a compound of the Formula V, $$HX—Q—Y—OH \qquad (V)$$

wherein

Y has the meaning given under Formula I,
X represents oxygen or sulphur, and
Q represents the direct bond or a bivalent hydrocarbon radical optionally interrupted by oxygen.

Examples of anthraquinone compounds of the Formula IV are:

1-amino-2-bromoanthraquinone,
1,4-diamino-2-bromoanthraquinone,
1-amino-4-hydroxy-2-bromo- or -2-chloroanthraquinone,
1-amino-4-hydroxy-2-phenoxy-anthraquinone,
1-amino-4-hydroxyanthraquinone-2-sulphonic acid,
1-amino-4-phenylaminoanthraquinone-2-sulphonic acid,
1-amino-4-cyclohexylaminoanthraquinone-2-sulphonic acid,
1-amino-4-hydroxy-2-p-methoxyphenoxy-anthraquinone.

Examples of compounds of the Formula V are: glycols such as ethyleneglycol, 1,3-propyleneglycol, 2,2-diethylpropanediol-(1,3), cyclohexanedimethanol, cyclohexanediethanol, cyclohexane-di-n-butanol, 2,5 - bis-(β-hydroxymethyl) - tetrahydrofuran, 2,5 - bis - (β-hydroxyethyl)-tetrahydrofuran, di-(β-hydroxyethoxy)-benzene, also m- or p-(β-hydroxyethoxy)-phenol, β-(p-hydroxy-phenylethyl alcohol, m-hydroxybenzyl alcohol, mercaptoalkyl alcohols such as 2-mercapto-ethanol, 3-mercapto-1-propanol or 4-mercapto-1-butanol.

Starting materials of the Formula II, in which Y is bound to A by way of a —SO₂NH— or —CONH— group or by way of a —O—phenylene—SO₂NH—, —O—phenylene—CONH—, —S—phenylene—SO₂NH— or —S—phenylene—CONH— group, can be obtained by reacting a halide of the Formula VI, $$A'—Q'—X_1—Hal \qquad (VI)$$

wherein

A' represents a β-anthraquinonyl radical,
Q' represents the direct bond or a phenylene group which is linked to A' by way of oxygen or sulphur,
$X_1$ represents the —CO— or —SO₂— bond, and
Hal represents chlorine or bromine, with an amine of the Formula VII, $$NH_2—Y—OH \qquad (VII)$$

wherein Y has the meaning given under Formula I.

Halides of the Formula VI are, e.g.

1-aminoanthraquinone-2-carbonyl chloride,
1-amino-4-phenylaminoanthraquinone-2-carbonyl chloride,
1-amino-4-hydroxy-anthraquinone-2-phenoxy-3'-carbonyl chloride,
1-amino-4-hydroxy-anthraquinone-2-phenoxy-4'-sulfonylchloride, or
1-amino-4-hydroxy-anthraquinone-2-phenylthio-4'-sulfonyl chloride, and amines of the Formula VII are, e.g. ethanolamine or 1,3-propanolamine.

The production of the anthraquinone compounds of the Formula II, wherein A represents a methyl group, which is bound to the anthraquinone nucleus A direct or by way of a phenoxy group, is described, e.g. in the French Pat. No. 1,530,985.

Examples of such starting materials of the Formula II are:

1,4-diamino-2-hydroxymethyl-anthraquinone,
1,4-dihydroxy-2-hydroxymethyl-anthraquinone,
1-amino-2-hydroxymethyl-4-phenylamino-anthraquinone, and
1-hydroxy-2-hydroxymethyl-4-phenylamino-anthraquinone.

The halogeno formic acid esters of the Formula III, usable as starting materials, are likewise for the most part known.

Such esters are: halogeno formic acid-alkyl, -alkenyl, -cycloalkyl or -aryl esters, e.g. chloroformic acid methyl ester, chloroformic acid ethyl ester, chloroformic acid isopropyl ester, chloroformic acid amyl ester, chloroformic acid allyl ester, chloroformic acid cyclohexyl ester, chloroformic acid-γ-chloropropyl ester, chloroformic acid phenyl ester or chloroformic acid - 2,4-dimethylphenyl ester, chloroformic acid-4-chlorophenyl ester, as well as the corresponding bromine derivatives.

The reaction of the anthraquinone compounds of the Formula II with the halogeno formic acid esters of Formula III is preferably performed at low temperature (0–50° C.) in the presence of acid-binding agents and, optionally, in inert organic solvents.

Suitable acid-binding agents are, in particular, tertiary nitrogen bases such as pyridine, picoline, quinoline, lepidine, aliphatic amines such as trimethylamine and triethylamine, anilines such as N,N-dimethylaniline and N,N-diethylaniline, also alkali metal or alkaline-earth metal carbonate, hydrogen carbonates or hydroxides such as sodium hydrogen carbonate, potassium carbonate, barium carbonate, sodium hydroxide or barium hydroxide. Suitable inert organic solvents are optionally halogenated or nitrated aromatic hydrocarbons such as toluene, xylenes, chlorobenzene, dichlorobenzene or nitrobenzene as well as aliphatic halogenated hydrocarbons such as chloroform, carbon tetrachloride or tetrachloroethane, also lower aliphatic ketones such as acetone and cyclic ethers such as dioxane or tetrahydrofuran.

Preferred anthraquinone dyestuffs of the Formula I, which are characterized by a good affinity, by good levelling and buildup properties as well as by good fastness to sublimation and light on polyethylene glycol terephthalate fibres, correspond to the Formula VIII.

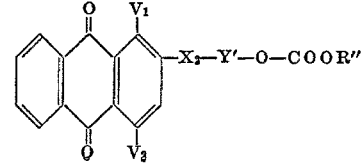

(VIII)

wherein $V_1$ represents the hydroxyl or amino group,
$V_2$ represents the hydroxyl group or a phenylamino group, optionally ring-substituted by halogen such as chlorine, lower alkyl or lower alkoxy group,
$X_2$ represents oxygen, sulphur, the —CONH— or —SO$_2$NH— group, or also a —O—alkylene—O— group,
Y' represents a lower alkylene group, and
R'' represents a lower alkyl group or a phenyl radical, optionally substituted by halogen, such as chlorine, or a lower alkyl group such as a methyl group.

Further anthraquinone dyestuffs, according to the invention, which likewise are characterized by a good affinity and levelling property, as well as by good fastness to light of the polyester dyeings produced therewith, are those of the Formulae IX and X,

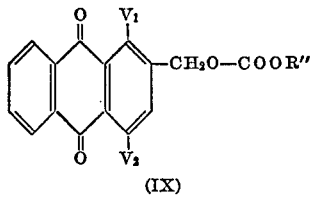

(IX)

and

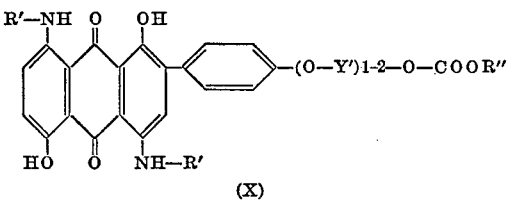

(X)

wherein $V_1$, $V_2$, Y' and R'' have the meaning given under Formula VIII, and
R' represents a lower alkyl group or preferably hydrogen.

In this specification, including the claims, the term "lower" applied to "alkyl," "alkylene" and "alkoxy" groups or moieties means that such groups or moieties have at most 5 carbon atoms.

Anthraquinone dyestuffs of Formula I, wherein the ROOC—O—Y— grouping is linked to the anthraquinone nucleus by way of a —NH—phenylene—, —NH—phenylene—O— or —NH—phenylene—S— group may also be produced by condensing a β-halogeno-anthraquinone compound of Formula XI, wherein A'' represents a β-anthraquinonyl radical which contains a hydroxyl group in the adjacent α-position, and
Hal represents chlorine or bromine, with an amino compound of Formula XII,

wherein
"arylene" represents a benzene nucleus, optionally substituted by halogen such as chlorine, or by lower alkyl groups,
Q'' represents the direct bond oxygen or sulphur and
Y and R have the meaning given under Formula I, whereby the starting materials are so chosen that the final dyestuff contains no-water-solubilizing groups dissociating acid in water.

β-Halogeno-anthraquinone compounds of Formula XI, usable according to the invention, are for the most part known. Examples of these are: 1-hydroxy-2-bromo-anthraquinone, 1,4-dihydroxy-2-bromoanthraquinone and 1,4-dihydroxy-2-chloro-anthraquinone.

Amines of the Formula XII to be reacted with the latter compounds of the Formula XI can be produced in a known manner e.g. by reacting a nitro compound of the Formula XIII,

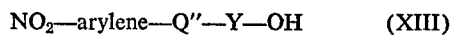

wherein "arylene," Q'' and Y have the meaning given above, with a halogeno formic acid ester of the Formula III given above, whereby the condensation is performed as described in the foregoing, and then reducing the nitro group to the amino group.

Furthermore, anthraquinone dyestuffs falling under Formula I and corresponding to the Formula XIV,

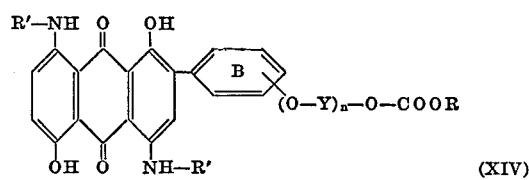

(XIV)

wherein

R' represents hydrogen or a lower alkyl group,
n represents 1 or 2, and
R and Y have the meaning given under Formula I, and wherein the benzene ring B may be further substituted by halogen or lower alkyl groups, may be produced by condensing a disulfonated anthraquinone compound of Formula XV

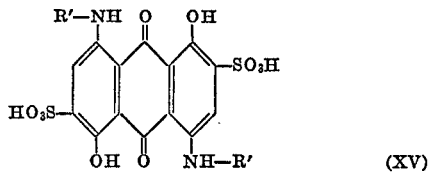

(XV)

with a compound of Formula XVI

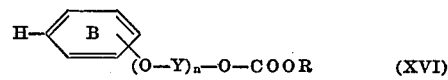

(XVI)

to a monosulfonated anthraquinone compound of Formula XVII

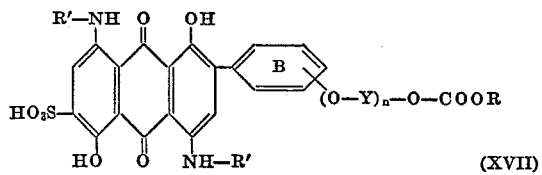

(XVII)

and then splitting off the sulphonic acid group of this latter compound with a reducing agent, whereby the starting materials are so chosen that the final dyestuff contains no water-solubilizing groups dissociating acid in water.

A further process for the production of anthraquinone dyestuffs of the Formula XIV comprises oxidizing an anthraquinone compound of Formula XVIII,

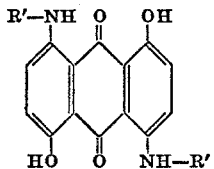

wherein R' represents hydrogen or a lower alkyl group, to the corresponding quinonimino compound, for example with manganese dioxide and then reacting the latter with a compound of the Formula XVI given above, whereby the starting materials are so chosen that the final dyestuff contains no water-solubilizing groups dissociating acid in water.

The new anthraquinone dyestuffs of the Formula I are yellow to deeply colored, crystalline, difficultly water-soluble substances. They can be obtained analytically pure by recrystallization from organic solvents, but such purification is generally not necessary for their use in dyeing.

They are suitable for the dyeing or printing of synthetic organic fibres, e.g. for the dyeing of textile fibres made from linear, high-molecular esters of aromatic polycarboxylic acids with polyfunctional alcohols such as polyethylene glycol terephthalate or poly-(1,4-cyclohexanedimethylol-terephthalate) as well as for the dyeing of textile fibres made from cellulose-2-, -2½-acetate or cellulose triacetate. These dyestuffs can, however, also be used for the dyeing of synthetic polyamide fibres such as polyhexamethylene adipamide, polycaprolactam or polyaminoundecanoic acid, as well as for the dyeing of polyolefins, especially polypropylene fibres, and also for the dyeing of polyamide in the mass.

Furthermore, they are suitable, depending on the composition, for the dyeing of lacquers, oils and waxes, as well as for the dyeing of cellulose derivatives, particularly cellulose esters such as cellulose acetate, in the mass.

Preferably, the dyeing of the mentioned fibre materials with the difficultly water-soluble anthraquinone dyestuffs, according to the invention, is carried out from aqueous dispersion. It is therefore advantageous to finely divide the final materials of the Formula I, usable as dispersion dyestuffs, by grinding them with dispersion agents and possibly with further grinding auxiliaries.

Anionic dispersing agents suitable for the purpose are, e.g. the alkylaryl sulphonates, the condensation products of formaldehyde with naphthalene sulphonic acid, the lignin sulphonates; suitable non-ionogenic dispersing agents are, e.g. the fatty alcohol or alkylphenyl-polyglycol ethers with higher alkyl radical.

The dyeing of the polyester fibres with the difficultly water-soluble dyestuffs, according to the invention, from aqueous dispersions, is carried out by the usual processes for polyester materials. Polyesters of aromatic polycarboxylic acids with polyvalent alcohols are preferably dyed at temperatures of above 100° C. under pressure. But the dyeing can also be performed at the boiling point of the dye bath in the presence of dye carriers, e.g. phenylphenols, polychlorobenzene compounds or similar auxiliaries, or by using the Thermosol process, i.e. pad-dyeing with a subsequent treatment in the heat, e.g. thermofixing at 190–210° C. Cellulose-2½-acetate fibres are preferably dyed at temperatures of 80–85° C., whereas cellulose triacetate fibres, as well as synthetic polyamide fibre material, are advantageously dyed at the boiling point of the dye bath. The use of dye carriers is not necessary in the dyeing of cellulose-2½-acetate or polyamide fibres. Anthraquinone dyestuffs, according to the invention, can also be used for the printing of the stated materials using normal methods.

The anthraquinone dyestuffs of the Formula I, usable as dispersion dyestuffs, draw on to the previously mentioned synthetic organic fibre material, especially on to polyethylene glycol terephthalate textile fibres, very well and they produce thereon strong yellow, orange, red violet, blue and green dyeings which have very good fastness to light, washing, rubbing, perspiration, sublimation, solvents and decatizing. In this respect, mixtures of anthraquinone dyestuffs according to the invention behave particularly favorably.

Furthermore, anthraquinone dyestuffs, according to the invention, can also very well be used in admixture with other dispersion dyestuffs, which are fast to sublimation, for the dyeing of textile material using the pad-dyeing/thermofixing process. Particularly worthy of note is the fact that dyestuffs of the Formula I produce, in the dyeing of closely woven polyester fabrics or firmly twisted polyester yarns, even dyeings right through.

Moreover, the dyestuffs of the Formula I possess the valuable property of being able to produce on textured polyester fibres, e.g. "Crimplene," very deep and non-streaky dyeings which also have good fastness properties, particularly fastness to light and sublimation. The new anthraquinone dyestuffs also have good stability in the dye liquor and to boiling.

The following examples illustrate the invention. The temperatures are given in degrees centigrade.

EXAMPLE 1

29.9 g. of 1-amino-2-β-hydroxyethoxy-4-hydroxyanthraquinone are dissolved at 50° in 300 g. of pyridine and to the deep red solution are added dropwise, after rapid cooling of the solution of 0–10° and while the latter is being vigorously stirred, 31 g. of chloroformic acid phenyl ester. The reaction is complete after one hour at this temperature. The reaction product of the formula

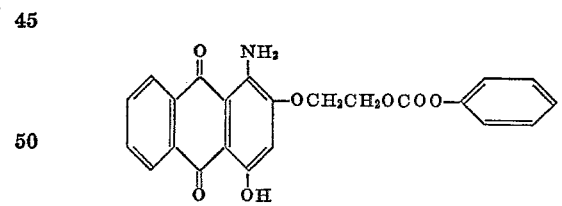

precipitates, on stirring the solution with 300 g. of methanol at 20°, in a crystalline form; it is filtered off, washed with methanol and dried.

Fibres made from cellulose di- and triacetate, as well as from polyethylene terephthalate, are dyed in the aqueous dispersion of this finely divided dyestuff in very pure and even red shades. The dyeings have very good fastness to light, sublimation and rubbing.

If, instead of the 29.9 g. of 1-amino-2-β-hydroxyethoxy-4-hydroxyanthraquinone, equivalent amounts of an anthraquinone compound listed in the following Table 1, column II, are used, and instead of the 31 g. of chloroformic acid phenyl ester, equivalent amounts of a halogen formic acid ester given in column III of the same table, using otherwise the same procedure as described in the example, then dyestuffs are obtained which dye polyethylene glycol terephthalate fibres in the shades listed in column IV of this table, these shades likewise having fastness to light and to sublimation.

TABLE 1

| No. | Anthraquinone compound | Halogen formic acid ester | Shade on polyethylene glycol terephthalate fibres |
|---|---|---|---|
| 2 | 1-NH₂, 2-OCH₂CH(CH₃)–CH₂OH, 4-OH anthraquinone | ClCOO–C₆H₃(CH₃)₂ (2,4-dimethylphenyl) | Red. |
| 3 | 1,5,8-triOH, 4-OCH₂CH₂OH anthraquinone | ClCOOCH₂CCl₃ | Orange. |
| 4 | 1-NH₂, 2-OCH₂–C₆H₄–CH₂OH (p-), 4-OH anthraquinone | ClCOOCH₂Cl | Red. |
| 5 | 1-NH₂, 2-OCH₂CH₂OH, 4-OH anthraquinone | ClCOOCH₃ | Red. |
| 6 | 1-NH₂, 2-OCH₂–(tetrahydrofuran-2-yl-CH₂OH), 4-OH anthraquinone | ClCOOCH₂–CH=CH₂ | Red. |
| 7 | 1-NH₂, 2-OCH₂C(CH₃)₂–CH₂OH, 4-OH anthraquinone | Cl–COO–C₆H₄–CH₃ | Red. |
| 8 | 1,4-diOH, 2-SCH₂CH₂OH anthraquinone | Cl–COO–C₆H₄–CH₃ | Orange. |
| 9 | 1-NH₂, 2-OCH₂CH₂OCH₂CH₂OH, 4-OH anthraquinone | ClCOOCH(CH₃)₂ | Red. |
| 10 | 1-NH₂, 2-OCH₂CH₂OH, 4-OH anthraquinone | ClCOOC₂H₅ | Red. |
| 11 | Same as above | ClCOOC₄H₉ | Red. |
| 12 | do | ClCOOC₅H₇ | Red. |
| 13 | do | ClCOOC₅H₁₁ | Red. |
| 14 | do | ClCOO–C₆H₁₁ (cyclohexyl) | Red. |

TABLE 1—Continued

| No. | Anthraquinone compound | Halogen formic-acid ester | Shade on polyethylene glycol terephthalate fibres |
|---|---|---|---|
| 15 | Same as Example 11 | ClCOOCH$_2$CH$_2$Br | Red. |
| 16 | 1-NH$_2$, 2-OCH$_2$CH$_2$O-C$_6$H$_4$-OCH$_2$CH$_2$OH, 4-OH anthraquinone | ClCOOCH$_2$CH$_3$ | Red. |
| 17 | 1-NH$_2$, 2-S-CH$_2$CH$_2$OH, 3-S-CH$_2$CH$_2$OH, 4-NH$_2$ anthraquinone | ClCOOCH$_3$ | Blue. |
| 18 | 1-NH$_2$, 2-SCH$_2$CH$_2$CH$_2$OH, 4-OH anthraquinone | ClCOOC$_3$H$_7$ | Ruby red. |
| 19 | 1-NH$_2$, 2-OCH$_2$CH$_2$CH$_2$OCH$_2$CH$_2$CH$_2$OH, 4-OH anthraquinone | ClCOO-C$_6$H$_5$ | Red. |
| 20 | Same as above | ClCOOC$_2$H$_5$ | Red. |
| 21 | 1-NH$_2$, 2-OCH$_2$CH$_2$-S-CH$_2$CH$_2$OH, 4-OH anthraquinone | ClCOO-C$_6$H$_5$ | Red. |
| 22 | Same as above | ClCOOC$_2$H$_5$ | Red. |
| 23 | 1-NH$_2$, 2-OCH$_2$CH$_2$OCH$_2$CH$_2$OH, 4-OH anthraquinone | ClCOOC$_2$H$_5$ | Red. |
| 24 | Same as above | ClCOO-C$_6$H$_5$ | Red. |
| 25 | 1-NH$_2$, 2-(OCH$_2$CH$_2$)$_2$OH, 4-OH anthraquinone | Same as above | Red. |
| 26 | Same as above | ClCOOC$_2$H$_5$ | Red. |
| 27 | 1-NH$_2$, 2-(OCH$_2$CH$_2$)$_4$OH, 4-NH anthraquinone | ClCOOC$_2$H$_5$ | Red. |
| 28 | Same as above | ClCOO-C$_6$H$_5$ | Red. |

TABLE 1—Continued

| No. | Anthraquinone compound | Halogen formic acid ester | Shade on polyethylene glycol terephthalate fibres |
|---|---|---|---|
| 29 | ![structure] 1-amino-2-(OCH₂CH₂CHOH-CH₃)-4-hydroxy anthraquinone | ClCOOC₂H₅ | Red. |
| 30 | ![structure] 1-amino-2-(SCH₂CH₂OCH₂CH₂OH)-4-hydroxy anthraquinone | ClCOOC₃H₇ | Ruby red. |

EXAMPLE 31

40.6 g. of 1,5-dihydroxy-4,8-diamino-2-(4'-β-hydroxyethoxy)-phenylanthraquinone are homogeneously mixed by stirring in 400 g. of N,N-dimethylaniline and to the mixture are added at 5–10°, 16.3 g. of chloroformic acid ethyl ester within half an hour. After a further hour at this temperature, the reaction mixture is diluted with 200 g. of ethanol, whereupon, the dyestuff of the formula

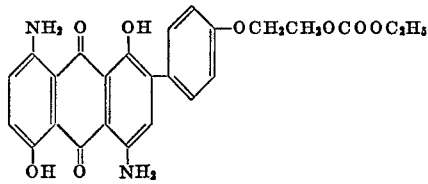

precipitates in a fine form. It is filtered off, washed with ethanol and dried.

Polyethylene glycol terephthalate fibers are dyed, in the aqueous dispersion of the finely divided dyestuff, in clear blue shades. The dyeings have very good fastness to light and to sublimation.

By using in the above example, instead of the 16.3 g. of chloroformic acid ethyl ester, 27 g. of the same substance, or by performing the reaction at 25–30°, a dyestuff is obtained which produces somewhat more reddish blue shades on polyethylene glycol terephthalate fibres.

EXAMPLE 32

7 g. of potassium carbonate and 34.5 g. of 1-amino-4-hydroxy-2-β,γ - dihydroxypropylmercaptoanthraquinone are homogeneously mixed by stirring in 380 g. of chlorobenzene and to the mixture are added, at 0–10° and in the course of 45 minutes, 24.5 g. of chloroformic acid isopropyl ester. Stirring afterwards proceeds for a further 2 hours at the same temperature and to the reaction mixture are finally added 100 g. of petroleum ether. The reaction product of the formula

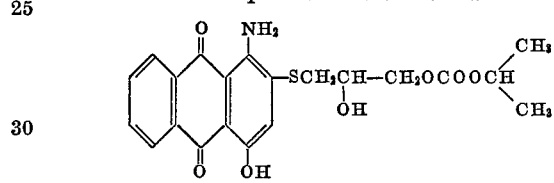

precipitates as black-violet powder. It is filtered off, washed with pertroleum ether and with water and dried.

The aqueous dispersion of the finely divided dyestuff dyes cellulose di- and triacetate fibres as well as, in particular, polyethylene glycol terephthalate fibres, in fll, even, bluish-red shades. The dyeings have good fastness to light, rubbing and wet processing.

The same dyestuff is obtained by using in the above example, instead of the 24.5 g. of chloroformic acid isopropyl ester, 33.4 g. of bromoformic acid isopropyl ester, using otherwise the same procedure as prescribed above.

If, instead of the 34.5 g. of 1-amino-4-hydroxy-2-β,γ-dihydroxypropylmercaptoanthraquinone, equivalent amounts of an anthraquinone compound listed in the following Table 2, column II, are used, and instead of the 24.5 g. of chloroformic acid isopropyl ester, equivalent amounts of a halogen formic acid ester given in column III of the same table, using otherwise the same procedure as described in the example, then dyestuffs are obtained which dye polyethylene glycol terephthalate fibres in the shades listed in column IV of this table, these shades likewise having fastness to light and to sublimation.

TABLE 2

| No. | Anthraquinone compound | Halogen formic acid ester | Shade on polyethylene glycol terephthalate fibres |
|---|---|---|---|
| 33 | 1-amino-2-(S-CH₂CH₂-OH)-4-hydroxy anthraquinone | ClCOOCH(CH₃)₂ | Bluish red. |
| 34 | 1-amino-2-(S-CH₂CH₂OH)-4-hydroxy anthraquinone | ClCOO-C₆H₅ | Do. |

TABLE 2—Continued

| No. | Anthraquinone compound | Halogen formic acid ester | Shade on polyethylene glycol terephthalate fibres |
|---|---|---|---|
| 35 | Same as Example 34 | ClCOOCH$_3$ | Bluish red. |
| 36 | do | ClCOOCH$_2$CH$_3$ | Do. |
| 37 | do | ClCOOC$_4$H$_9$ | Do. |
| 38 | do | ClCOO—C$_6$H$_4$—CH$_3$ | Do. |
| 39 | 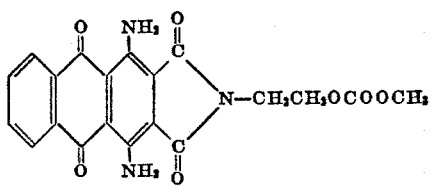 | Cl—COOC$_2$H$_5$ | Do. |
| 40 | Same as above | Cl—COO—C$_6$H$_5$ | Do. |

EXAMPLE 41

To a mixture of 350 g. of chlorobenzene and 80 g. of triethylamine are added 35.1 g. of 1,4-diaminoanthraquinone - 2,3-dicarboxylic acid-β-hydroxyethylimide and homogeneously mixed by stirring at 40°. The suspension is cooled to 0–10° and 19 g. of chloroformic acid methyl ester are added dropwise in the course of half an hour. To complete the reaction, stirring is carried out for a further hour at this temperature. 200 g. of methanol are then added, whereupon the corresponding dyestuff of the formula

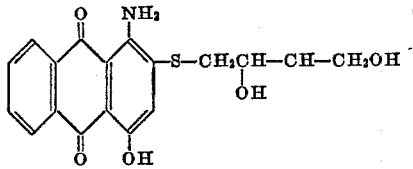

precipitates in a finely divided form from the reaction mixture. The dyestuff is filtered off, washed with methanol and dried.

Fabrics made from polyethylene glycol terephthalate fibres are dyed from the aqueous dispersion of the finely divided dyestuff in very pure, even, turquoise blue shades. The dyeings have good fastness to light and to rubbing.

If, the above example, instead of 19 g. of chloroformic acid methylester, 26.3 g. of chloroformic acid n-butylester or 21.7 g. of chloroformic acid ethylester are used, then two further dyestuffs are obtained which produce turquoise bluedyeings on polyethylene glycol terephthalate fibres. A very similar dyestuff is also obtained by using instead of the 35.1 g. of 1,4-diaminoanthraquinone-2,3-dicarboxylic acid β-hydroxyethylimide, 36.5 g. of 1,4-diamino-anthraquinone - 2,3-dicarboxylic acid-γ-hydroxypropylimide, and otherwise acylating as in the above example. A somewhat less greenish blue dyestuff is obtained by replacing, in the above example, the 35.1 g. of 1,4-diamino-anthraquinone-2,3-dicarboxylic acid-β-hydroxyethylimide by 35 g. of 1-amino-2-β-hydroxyethyl-3-oxo - 4,7 - diamino - 5,6 - phthaloyl-dihydroisoindole, proceeding otherwise according to the above example.

In an analogous way the dyestuffs listed below were obtained. They dyed polyester fibers in turquoise blue shades.

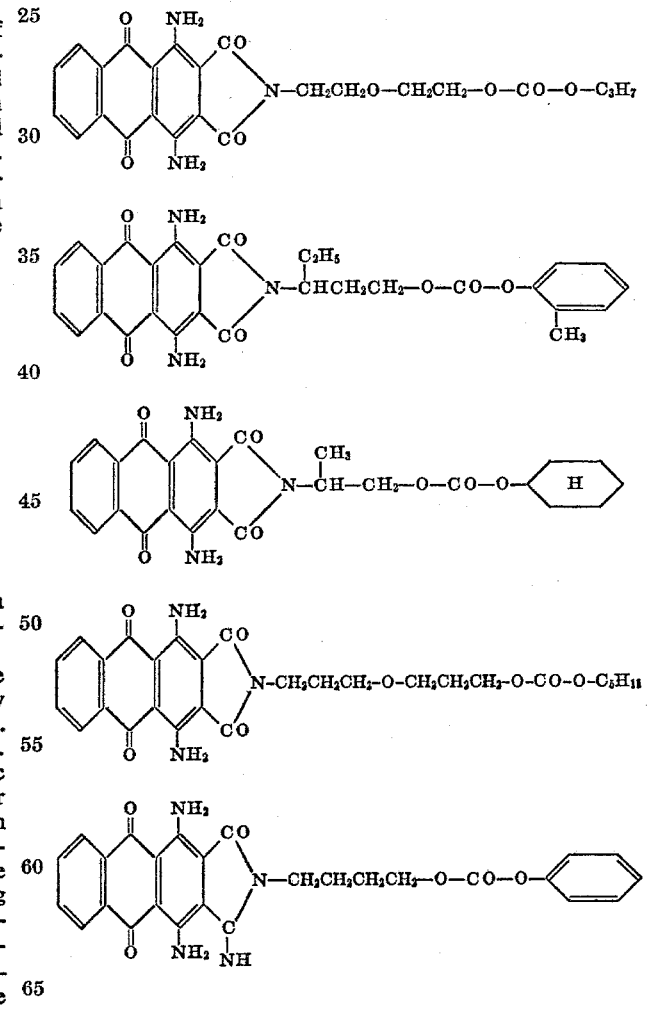

EXAMPLE 42

34.4 g. of 1 - amino-2-hydroxymethyl-4-phenylamino-anthraquinone are dissolved, while heat is being applied, in 300 g. of pyridine. The deep blue solution is cooled to 0–5° and to this are added dropwise at this temperature, while the solution is being well stirred, 28 g. of chloroformic acid amyl ester. After the dropwise addition is completed, the reaction mixture is stirred for a further 3 hours at 0-10° to complete the acylation. To effect precipitation of the dyestuff of the formula

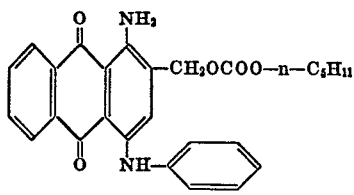

200 g. of methanol are then added to the reaction mixture. The dyestuff is separated by filtration, washed with methanol and dried.

The finely divided dyestuff evenly dyes fibres made from cellulose di- and triacetate, as well as polyethylene glycol terephthalate fibres, in aqueous dispersion, in deep blue shades having good fastness to light and to sublimation.

By using, instead of the 34.4 g. of 1-amino-2-hydroxymethyl-4-phenylaminoanthraquinone, equivalent amounts of an anthraquinone compound given in the following Table 3, column II, and instead of the 28 g. of chloroformic acid-n-amyl ester, equivalent amounts of a halogen formic acid ester given in column III of the same table, with otherwise the same procedure as stated in the example, dyestuffs are obtained which dye polyethylene glycol terephthalate fibres in the shades listed in column IV of this table, these shades likewise having fastness to light and sublimation.

TABLE 3

| No. | Anthraquinone compound | Halogen formic acid ester | Shade on polyethylene glycol terephthalate fibres |
|---|---|---|---|
| 43 | (1-amino-2-hydroxymethyl-4-hydroxyanthraquinone) | ClCOO—C$_6$H$_4$—CH$_3$ | Red. |
| 44 | (1-amino-2-hydroxymethyl-4-(2,6-dimethylphenylamino)anthraquinone) | ClCOOCH(CH$_3$)CH$_2$Cl | Reddish blue. |
| 45 | (1-amino-2-hydroxymethyl-4-phenylthioanthraquinone) | ClCOOCH$_2$CH$_2$CH$_2$Cl | Red. |
| 46 | (1-amino-2-(4-hydroxymethylphenoxy)-4-hydroxyanthraquinone) | ClCOOCH$_2$CH$_2$Br | Red. |
| 47 | (1-amino-2-hydroxymethyl-4-(4-methoxyphenylamino)anthraquinone) | BrCOOC$_2$H$_5$ | Blue |
| 48 | (1-hydroxy-2-hydroxymethyl-4-phenylaminoanthraquinone) | ClCOO—C$_6$H$_5$ | Violet. |
| 49 | Same as above | Cl—COO-n-C$_5$H$_{11}$ | Do. |

TABLE 3—Continued

| No. | Anthraquinone compound | Halogen formic acid ester | Shade on polyethylene glycol terephthalate fibres |
|---|---|---|---|
| 50 | (1-NH₂, 2-CH₂OH, 4-NH-phenyl anthraquinone) | ClCOOCH₃ | Blue. |
| 51 | Same as above | Cl—COOC₂H₅ | Do. |
| 52 | do | ClCOOC₄H₉(n) | Do. |
| 53 | do | ClCOO—C₆H₅ | Do. |
| 54 | (1-NH₂, 2-S-C₆H₄-CH₂OH, 4-OH anthraquinone) | Cl—COO—CH₃ | Red-violet. |

EXAMPLE 55

39 g. of 1-amino-2-β-hydroxyethylmercapto-4-anilino-anthraquinone are roughly dissolved at 20–25° in 400 g. of pyridine and to this solution are added dropwise, during 15 minutes at 5–10°, 16.3 g. of chloroformic acid ethyl ester. The acylation is completed after a further half an hour at this temperature. The dyestuff of the formula

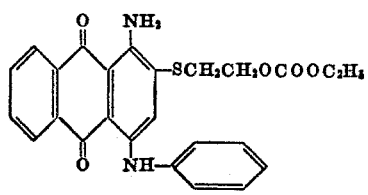

precipitates, upon the addition of 400 g. of methanol, in crystalline form; the dyestuff is filtered off, washed with methanol and dried.

The finely divided dyestuff very evenly dyes, in aqueous dispersion, fabrics made from polyethylene glycol terephthalate fibres in deep blue shades having very good fastness to rubbing and to sublimation.

By using, instead of 39 g. of 1-amino-2-β-hydroxyethylmercapto - 4 - anilinoanthraquinone, equivalent amounts of an anthraquinone compound given in the following Table 4, column II, and instead of 16.3 g. of chloroformic acid ethyl ester, halogen formic acid ester, using otherwise the same procedure as described in the example, dyestuffs are obtained which dye polyethylene glycol terephthalate fibres in the shades listed in column IV of this table.

TABLE 4

| No. | Anthraquinone compound | Halogen formic acid ester | Shade on polyethylene glycol terephthalate fibres |
|---|---|---|---|
| 56 | (1-NH₂, 2-SCH₂CH₂OH, 4-NH-(2,4,6-trimethylphenyl) anthraquinone) | ClCOOCH₂CHCl₂ | Blue. |
| 57 | (1-NH₂, 2-SCH₂CHOHCH₂OH, 4-NH-phenyl anthraquinone) | ClCOOC₂H₅ | Do. |
| 58 | (1-NH₂, 2-OCH₂CH₂OH, 4-NH-(2,4,6-trimethylphenyl) anthraquinone) | Cl—COOC₂H₄Cl | Violet. |

TABLE 4—Continued

| No. | Anthraquinone compound | Halogen formic acid ester | Shade on polyethylene glycol terephthalate fibres |
|---|---|---|---|
| 59 | 1-NH$_2$, 2-OCH$_2$CH$_2$OH, 4-NH(C$_6$H$_4$-OCH$_3$) anthraquinone | ClCOOC$_5$H$_{11}$ | Violet-blue. |
| 60 | 1-NH$_2$, 2-SCH$_2$CH(OH)CH$_2$OH, 4-NHCH(CH$_3$)$_2$ anthraquinone | ClCOO-C$_6$H$_5$ | Blue. |
| 61 | 1-NH$_2$, 2-S-CH$_2$CH$_2$OH, 4-NH(C$_6$H$_4$-CH$_3$) anthraquinone | Cl—COO—C$_2$H$_5$ | Do. |
| 62 | 1-NH$_2$, 2-O-CH$_2$CH$_2$OH, 4-NH-C$_6$H$_5$ anthraquinone | Cl—COO—C$_2$H$_5$ | Violet-blue. |
| 63 | 1-NH$_2$, 2-SCH$_2$CH$_2$OH, 4-NH-C$_6$H$_5$ anthraquinone | ClCOOCH$_3$ | Blue. |
| 64 | Same as above | ClCOOC$_2$H$_5$ | Do. |
| 65 | do | ClCOOC$_4$H$_9$(n) | Do. |
| 66 | 1-NH$_2$, 2-SCH$_2$CH(OH)CH$_2$OH, 4-NH-C$_6$H$_5$ anthraquinone | ClCOO-C$_6$H$_5$ | Do. |
| 67 | 1-NH$_2$, 2-SCH$_2$CH$_2$OH, 4-NH-C$_6$H$_5$ anthraquinone | Same as above | Do. |
| 68 | 1-NH$_2$, 2-SCH$_2$CH(OH)CH$_2$OH, 4-NH-C$_6$H$_5$ anthraquinone | ClCOOC$_2$H$_5$ | Do. |

TABLE 4—Continued

| No. | Anthraquinone compound | Halogen formic acid ester | Shade on polyethylene glycol terephthalate fibres |
|---|---|---|---|
| 69 | (1-amino-2-(OCH₂CH₂OH)-4-(NH-phenyl-Cl)-anthraquinone) | Cl—COOC₂H₅ | Blue. |
| 70 | (1-amino-2-(O-CH₂CH₂OH)-4-(NH-phenyl-CH₃,Cl)-anthraquinone) | Cl—COO—C₃H₇ | Violet-blue. |

EXAMPLE 71

45.4 g. of 1-amino-4-hydroxyanthraquinone-2-phenoxy-4'-sulphonic acid - β - hydroxyethylamide are homogeneously mixed by stirring in 350 ml. of pyridine and to the mixture are added dropwise at 0–10°, within half an hour, 33 g. of chloroformic acid-β-bromoethyl ester and the mixture is maintained at this temperature for a further 2 hours. 300 ml. of ethyl alcohol are added to the deep red solution and the reaction product of the formula

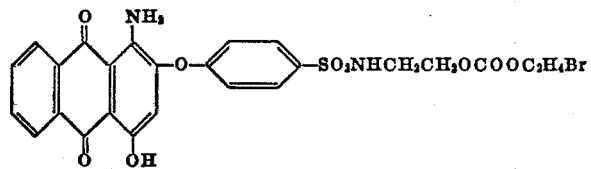

gradually precipitates in a fine-crystalline form. The reaction product is filtered off, washed on the filter with ethyl alcohol and afterwards dried.

The finely divided dyestuff dyes polyethylene glycol terephthalate fibres, in aqueous dispersion, in brilliant red shades having very good fastness to light, sublimation and rubbing.

By using, instead of the 45.4 g. of 1-amino-4-hydroxyanthraquinone-2-phenoxy-4'-sulphonic acid - β - hydroxyethylamide, equivalent amounts of an anthraquinone compound given in the following Table 5, column II, and instead of the 33 g. of chloroformic acid-β-bromoethyl ester, equivalent amounts of a halogen formic acid ester, given in column III of the same table, with otherwise the same procedure as described in the example, dyestuffs are obtained which dye polyethylene glycol terephthalate fibres in the shades listed in column IV of this table, these shades likewise having fastness to light and sublimation.

TABLE 5

| No. | Anthraquinone compound | Halogen formic acid ester | Shade on polyethylene glycol terephthalate fibres |
|---|---|---|---|
| 72 | (1-amino-4-hydroxy-2-(O-phenyl-SO₂NHCH₂CH₂OH)-anthraquinone) | ClCOOCH₃ | Red violet. |
| 73 | (1,3-diamino-2,4-bis(O-phenyl-SO₂NHCH₂CH₂OH)-anthraquinone) | Cl—COOC₂H₄Br | Do. |
| 74 | (1,4-diamino-3-chloro-2-(O-phenyl-SO₂NHCH₂CH₂CH₂OH)-anthraquinone) | Cl—COOC₂Cl₅ | Do. |

TABLE 5—Continued

| No. | Anthraquinone compound | Halogen formic acid ester | Shade on polyethylene glycol terephthalate fibres |
|---|---|---|---|
| 75 | ![structure] 1-amino-4-hydroxy-anthraquinone with -S-C6H4-SO2NHCH2CHCH2OH (OH) at 2-position | ClCOOC2H5 | Ruby red. |
| 76 | ![structure] 1-amino-4-hydroxy-anthraquinone with -S-C6H4-SO2NHCH2-CH2CH2OH at 2-position | Cl—COOC2H5 | Do. |
| 77 | ![structure] 1-amino-4-hydroxy-anthraquinone with -O-C6H4-SO2NHCH2CH2OH at 2-position | ClCOOC2H5 | Red. |
| 78 | Same as above | ClCOO—C6H5 | Red. |
| 79 | do | ClCOOC4H9 | Orange. |
| 80 | ![structure] 1-amino-4-hydroxy-anthraquinone with -S-C6H4-SO2NHCH2CH2OH at 2-position | ClCOOC2H5 | Ruby red. |

EXAMPLE 81

39.1 g. 1-amino - 4 - hydroxy-2-(4'-β-hydroxyethoxy-phenoxy)-anthraquinone are sprinkled into 350 ml. of pyridine at 35–40° whilst the mixture is being vigorously stirred. The mixture is cooled to 10–15° and to it are added, in small portions, 43.3 g. of chloroformic acid tribromoethyl ester. Stirring is maintained at this temperature until the starting material can no longer be detected by thin-layer chromatography.

With the addition of 350 ml. of methanol, the formed dyestuff of the formula

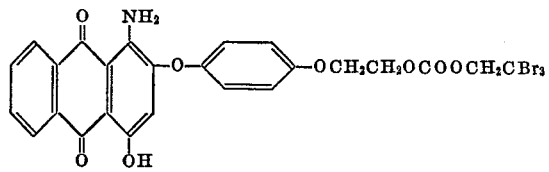

precipitates in the form of fine dark-red crystals from the reaction mixture. The dyestuff is filtered off, washed with methanol and water and dried.

The finely divided dyestuff dyes polyethylene terephthalate fibres, from aqueous dispersion, in even blueish-red shades having excellent fastness to light, sublimation and rubbing.

If, in the above example, instead of 39.1 g. of 1-amino-4-hydroxy-2-(4' - β - hydroxyethoxy-phenoxy)-anthraquinone 40.7 g. of 1-amino-4-hydroxy-2-(4'-β-hydroxyethoxy-phenylthio)-anthraquinone and the same procedure as prescribed above are used, then a little more blueish-red dyestuff having the same good dyeing properties is obtained.

EXAMPLE 82

To a solution of 31.2 g. of 1-aminoanthraquinone-2-carboxylic acid-γ-hydroxypropylamide in 300 ml. of pyridine are added in small portions at 0–10°, whilst the solution is being vigorously stirred, 46.6 g. of chloroformic acid-p-methylphenyl ester within one hour. To complete the reaction, the reaction mixture is held at this temperature for a further two hours. By the slow dropwise addition of 50 ml. of water, the dyestuff of the formula

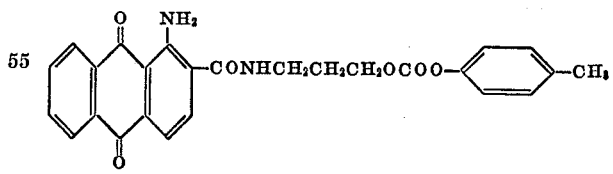

is precipitated as fine red powder. The dyestuff is filtered off, washed with water until the reaction is neutral and with a little methanol, and then dried.

From aqueous dispersion, the finely divided dyestuff dyes fibres made from cellulose di- and triacetate, as well as, in particular, fibres made from polyethylene terephthalate, in very even red shades having good fastness to light and to rubbing.

By using, instead of the 31.2 g. of 1-aminoanthraquinone-2-carboxylic acid-γ-hydroxypropylamide, equivalent amounts of an anthraquinone compound given in the following Table 6, column II, and instead of the 46.6 g. of chloroformic acid - p - methoxyphenyl ester, equivalent amounts of a halogen formic acid ester given in column III of the same table, with otherwise the same procedure as given in the example, dyestuffs are obtained which dye polyethylene glycol terephthalate fibres in the shades listed in column IV of this table, these shades likewise having fasness to light and to sublimation.

TABLE 6

| No. | Anthraquinone compound | Halogen formic acid ester | Shade on polyethylene glycol terephthalate fibres |
|---|---|---|---|
| 83 | 1-NH₂, 2-CONHCH₂CH₂CH₂OH anthraquinone | ClCOO—C₆H₄—CH₃ | Red. |
| 84 | 1-NH₂, 2-CONHCH₂CH₂OH, 4-NH-phenyl anthraquinone | ClCOOCH(CH₃)₂ | Blue. |
| 85 | 1-NH₂, 2-SO₂NHCH₂CH₂OH, 4-NH-phenyl anthraquinone | ClCOOC₄H₉(n) | Do. |
| 86 | 1-NH₂, 2-CONHCH₂CH₂OH, 4-OH anthraquinone | Br—COO—C₆H₅ | Blueish red. |
| 87 | 1-NH₂, 2-CONHCH₂CH(OH)CH₂OH, 4-NHCH(CH₃)₂ anthraquinone | ClCOOCH₃ | Blue. |
| 88 | 1-NH₂, 2-CONHCH₂CH₂OH anthraquinone | ClCOOC₂H₅ | Red. |
| 89 | 1-NH₂, 2-COOCH₂CH₂OH, 4-NH—C₆H₄—N=N—C₆H₅ anthraquinone | ClCOOC₂H₅ | Green. |
| 90 | 1-NH₂, 2-SO₂OCH₂CH₂OH, 4-NH—C₆H₄—N=N—C₆H₅ anthraquinone | ClCOOC₂H₅ | Yellowish green. |
| 91 | 1-NH₂, 2-COOCH₂CH₂OH anthraquinone | Cl—COO—C₆H₅ | Red. |

TABLE 6—Continued

| No. | Anthraquinone compound | Halogen formic acid ester | Shade on polyethylene glycol terephthalate fibres |
|---|---|---|---|
| 92 | 1-NH$_2$-4-OH-2-COOCH$_2$CH$_2$OH-anthraquinone | ClCOOC$_4$H$_9$ | Blueish red. |
| 93 | 1-NH$_2$-4-NH(C$_6$H$_5$)-2-COOCH$_2$CH$_2$OH-anthraquinone | ClCOOC$_2$H$_5$ | Blue. |
| 94 | 1-NH$_2$-2-SO$_2$OCH$_2$CH$_2$OH-anthraquinone | ClCOOC$_4$H$_9$ | Red. |
| 95 | 1-NH$_2$-4-NH(C$_6$H$_5$)-2-COOCH$_2$CH$_2$OCH$_2$CH$_2$OH-anthraquinone | ClCOOC$_2$H$_5$ | Blue. |
| 96 | 1-NH$_2$-4-NH(o-Cl-C$_6$H$_4$)-2-COOCH$_2$CH$_2$OH-anthraquinone | ClCOOC$_4$H$_9$ | Do. |

EXAMPLE 97

42.3 g. of 1-hydroxy - 2 - β - hydroxyethylsulphonyl-4-phenylaminoanthraquinone are homogeneously mixed by stirring at room temperature in 350 ml. of pyridine. After slight cooling of this mixture to 10–15°, 34 g. of chloroformic acid butyl ester are added to it dropwise within 30 minutes. The mixture is maintained at this temperature until the starting material is no longer detectable. The dyestuff of the formula

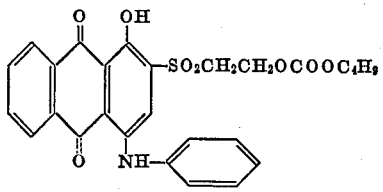

is precipitated, by the addition of 300 ml. of methanol, in a fine-crystalline form from the reaction mixture. The dyestuff is then filtered off, washed on the filter with methanol and dried.

With the finely divided dyestuff are obtained on polyethylene terephthalate fibres, from aqueous dispersion, even, deep, reddish blue shades having very good fastness to light and to sublimation.

A reddish blue dyestuff possessing similar properties is obtained by using, instead of 34 g. of chloroformic butyl ester, 19 g. of chloroformic acid methyl ester; a greenish blue dyestuff having similar good fastness properties is obtained by using, instead of the 42.3 g. of 1-hydroxy-2-β-hydroxyethylsulphonyl - 4 - phenylaminoanthraquinone, 42.2 g. of 1-amino-2-β-hydroxyethylsulphonyl-4-phenylaminoanthraquinone, proceeding otherwise according to the above example.

EXAMPLE 98

31.9 g. of 1,4-dihydroxy-2-bromoanthraquinone and 56 g. of 4'-(β-ethoxycarbonyloxy-ethoxy)-aniline are stirred up in 350 g. of boiling ethylene glycol monomethyl ether for 15 hours; to the deep violet-red reaction solution are added, at 100°, 70 ml. of water and the solution is cooled to room temperature. The precipitated crystalline dyestuff of the formula

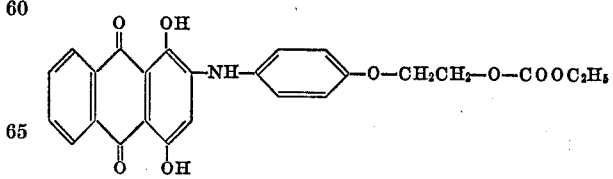

is then filtered off, washed with methanol and dried.

From an aqueous dispersion, the finely-divided dyestuff dyes fabric, made from polyethylene terephthalate fibres, in even red-violet shades having excellent fastness to light and to sublimation.

By using, instead of the 31.9 g. of 1,4-dihydroxy-2-bromoanthraquinone, equivalent amounts of an anthraquinone compound, given in the following Table 7, column II, and instead of the 56 g. of 4'-(β-ethoxy-carbonyloxy-ethoxy)-aniline, equivalent amounts of an aniline derivative given in column II of the same table, with otherwise the same procedure as described in the example, dyestuffs are obtained which dye polyethylene glycol terephthalate fibres in the shades listed in column IV of this table, these shades likewise having fastness to light and to sublimation.

very good fastness to sublimation, are obtained on polyethylene terephthalate fibres by replacing, in the above example, the 30.4 g. of 1(N),9-(2'-methyl)-pyridino-2-β-hydroxyethylaminoanthraquinone by 32.3 g. of 1(N),9-(N)-pyrimidino-2-β-hydroxyethylthio - 4 - aminoanthraquinone and acylating by using either the same amount of chloroformic acid phenyl ester or by using 21.7 g. of

TABLE 7

| No. | Anthraquinone compound | Halogen formic acid ester | Shade on polyethylene glycol terephthalate fibres |
|---|---|---|---|
| 99 | (1,4-dihydroxy-2-bromo anthraquinone) | NH₂—⟨⟩—OCH₂CH₂OCOOCH₃ | Red. |
| 100 | (1-hydroxy-2-bromo anthraquinone) | NH₂—⟨⟩—CH₂CH₂OCOOC₃H₇ | Red. |
| 101 | (1,4-dihydroxy-2-bromo anthraquinone) | NH₂—⟨⟩—OCH₂CHCH₂COOC₂H₅ with OH | Red. |
| 102 | Same as above | NH₂—⟨⟩—OCH₂CH₂—O—COO—⟨⟩—Cl | Red. |
| 103 | do | NH₂—⟨⟩—OCH₂CH₂O—COOC₄H₉ | Red. |
| 104 | do | NH₂—⟨⟩—(OCH₂CH₂)₂OCOOC₂H₅ | Red. |
| 105 | do | NH₂—⟨⟩—CH₂OCOOC₄H₉ | Red. |
| 106 | do | NH₂—⟨⟩—CH₂CH₂CH₂OCOOCH₃ | Red. |

EXAMPLE 107

30.4 g. of 1(N),9-(2'-methyl)-pyridino-2-β-hydroxyethylaminoanthraquinone are homogeneously mixed in 300 g. of 3-picoline at 0–5°; and at the same temperature are then added dropwise, within one hour, 31 g. of chloroformic acid phenyl ester. After 4 hours, the reaction product of the formula

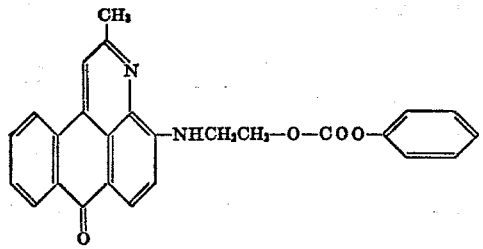

is precipitated from the mixture by the addition of 450 g. of methanol. It is filtered off, washed with methanol and dried.

From its finely divided aqueous dispersion, this dyestuff dyes polyethylene terephthalate fibres in intensely yellow shades having fastness to sublimation.

Very deeply colored, pure yellow dyestuffs, having chloroformic acid ethyl ester, under otherwise the same conditions.

EXAMPLE 108

To a solution of 800 g. of 96% sulphuric acid and 22 g. of o-boric acid are added, at 40–50° and within ½ hour, 48 g. of 1,5-dihydroxy-4,8-diaminoanthraquinone-3,6-disulphonic acid. The solution is cooled to 10° and to it are then added 38 g. of β-monophenoxy-diethyl carbonate. Stirring is maintained for half an hour at 10° and the temperature then allowed to rise within half an hour to room temperature. After this period of time, the reaction mixture is poured on to two litres of ice/methanol (30% methanol) and then heated for 4 hours to 60°.

The product of the formula

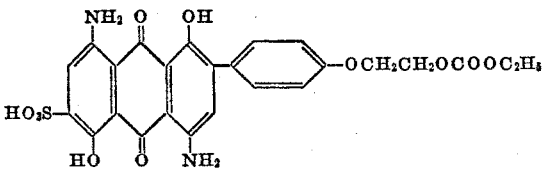

is filtered off, washed with 5% brine and dried.

33 g. of the dried product are suspended in 400 ml. of 50% methanol, to the suspension are added 40 ml. of concentrated ammonia and to the whole are added dropwise 18 g. of sodium hyposulphite in 60 ml. water, the mixture being then heated for one hour to 40–50°.

The dyestuff of the formula

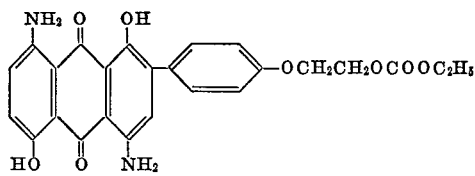

precipitats out, is washed first with cold water, then with hot water and finally with hot methanol, and dried. The dyestuff is identical to that obtained according to Example 31.

EXAMPLE 109

28.6 g. of 1,5-dihydroxy-4,8-diaminoanthraquinone are added to 270 ml. of 95% sulphuric acid at 20–30° within 25 minutes. The yellowish brown solution is cooled to 0–5° and oxidized with 18 g. of manganese dioxide, within 30 minutes, to the corresponding quinonimine. The deep-blue solution of the quinonimine is filtered through a glass frit, the residue washed with 180 ml. of 96% sulphuric acid, cooled to −30° and 30.5 g. of β-monophenoxy-diethyl carbonate are added. The reaction at this temperature is completed after 2 hours. The reaction product of the formula

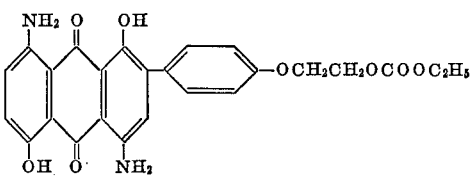

precipitates out in crystalline form as the solution is stirred with ice. The reaction product is filtered off, washed neutral with water, subsequently treated with methanol and dried.

This dyestuff is identical to that stated under Example 31.

If, instead of the 28.6 g. of 1,5-dihydroxy-4,8-diaminoanthraquinone equivalent amounts of the anthraquinone compound given in the following Table 8, column II, are used, or if the 30.5 g. of β-monophenoxydiethyl carbonate are replaced with equivalent amounts of the phenoxy compound given in column III of the same table, with otherwise the same procedure as described in the Example 109, then dyestuffs are obtained which dye polyethylene glycol terephthalate fibres in shades having similar properties, these shades being listed in column IV of the same table.

TABLE 8

| No. | Anthraquinone compound | Halogen formic acid ester | Shade on polyethylene glycol terephthalate fibres |
|---|---|---|---|
| 110 | 1,5-dihydroxy-4,8-diaminoanthraquinone (structure shown) | H—⟨C₆H₄⟩—OCH₂CH₂OCOOCH₃ | Blue. |
| 111 | Same as above | H—⟨C₆H₄⟩—OCH₂CH₂—O—COOCH(CH₃)₂ | Do. |
| 112 | do | H—⟨C₆H₄⟩—OCH₂CH₂O—COOC₄H₉-n | Do. |
| 113 | do | H—⟨C₆H₃(Cl)⟩—OCH₂CH₂—O—COOC₃H₇-n | Do. |
| 114 | do | H—⟨C₆H₄⟩—OCH₂CH₂—O—COO—CH₂—CH(CH₃)₂ | Do. |
| 115 | do | H—⟨C₆H₄⟩—OCH₂CH₂—O—COO—CH(CH₃)(C₂H₅) | Do. |
| 116 | do | H—⟨C₆H₃(CH₃)⟩—OCH₂CH₂—O—COO—⟨C₆H₅⟩ | Do. |
| 117 | do | H—⟨C₆H₄⟩—OCH₂CH₂—O—COO—⟨C₆H₄—H⟩ | Do. |
| 118 | do | H—⟨C₆H₄⟩—OCH₂CH₂—O—COO—⟨C₆H₄⟩—Cl | Do. |
| 119 | do | H—⟨C₆H₄⟩—OCH₂CH₂—O—COO—⟨C₆H₄(CH₃)⟩ | Do. |
| 120 | do | H—⟨C₆H₄⟩—O—CH₂—CH₂—CH₂—O—COOC₂H₅ | Do. |

TABLE 8—Continued

| No. | Anthraquinone compound | Halogen formic acid ester | Shade on polyethylene glycol terephthalate fibres |
|---|---|---|---|
| 121 | Same as Example 120 | H—⟨phenyl⟩—O—CH$_2$—CH(OH)—CH$_2$—O—COOC$_2$H$_5$ | Blue. |
| 122 | do | H—⟨phenyl⟩—O—CH$_2$—CH$_2$—O—CH$_2$CH$_2$O—COOC$_2$H$_5$ | Do. |
| 123 | do | H—⟨phenyl⟩—OCH$_2$CH$_2$CH$_2$OCH$_2$CH$_2$CH$_2$OCOOC$_2$H$_5$ | Do. |
| 124 | do | H—⟨phenyl⟩—OCH$_2$CH$_2$OCH$_2$CH$_2$CH$_2$O—COOC$_2$H$_5$ | Do. |
| 125 | do | H—⟨phenyl⟩—OCH$_2$CH$_2$CH$_2$OCH$_2$CH$_2$O—COOC$_2$H$_5$ | Do. |
| 126 | do | H—⟨phenyl⟩—OCH$_2$CH$_2$OCOOCH$_2$CH$_2$Br | Do. |
| 127 | 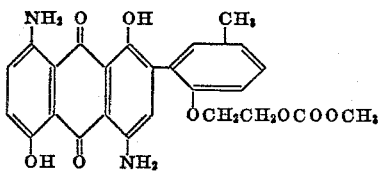 | H—⟨phenyl⟩—O—CH$_2$CH$_2$O—COOC$_2$H$_5$ | Do. |
| 128 | C$_2$H$_5$NH/OH anthraquinone with NHC$_2$H$_5$ | Same as above | Do. |

EXAMPLE 129

28.6 g. of 1,5-dihydroxy-4,8-diaminoanthraquinone are introduced in small portions within half an hour at 25° into 270 ml. of 96% sulphuric acid, whereupon the yellowish-brown solution is cooled to 0° and, within a further half hour, oxidized with 18 g. of manganese dioxide to quinonimine. The obtained deep blue solution is clarified through a glass frit and to the solution are added, at —10 to —5°, 31 g. of β-(p-methylphenoxy)-ethyl-methyl carbonate. At this temperature the reaction is completed after one hour, the formed reaction product of the formula

[structural formula: anthraquinone with NH$_2$, OH, CH$_3$, OCH$_2$CH$_2$OCOOCH$_3$ substituents]

precipitates, on being poured on to ice water, in crystalline form. It is filtered off, washed with water until the reaction is neutral and dried.

From its finely divided aqueous dispersion, this dyestuff dyes polyethylene terephthalate fibers in pure blue shades having very good fastness to light, sublimation and wet processings.

If, in the above example, the 18 g. of manganese dioxide are replaced by 11 g. of concentrated nitric acid, the procedure being otherwise as described above, the same blue dyestuff is obtained.

EXAMPLE 130

In a pressure dyeing apparatus, 2 g. of the dyestuff, obtained according to Example 31, are finely suspended in 2000 g. of water containing 4 g. of oleylpolyglycol ether. The pH-value of the dye bath is adjusted with acetic acid to 4–5.

100 g. of fabric made from polyethylene glycol terephthalate are then introduced at 50°, the dye bath is heated within 30 minutes to 140° and dyeing is carried out at this temperature for 50 minutes. The dyeing is afterwards rinsed with water, soaped and dried. Under these conditions is obtained a deeply colored, level, blue dyeing having fastness to perspiration, light and sublimation.

The dyestuff described in the other examples produce, using this process, dyeings of equal quality.

EXAMPLE 131

Polyethylene glycol terephthalate fabric is impregnated on a padding machine at 40° with a dye liquor of the following composition:

20 g. of the dyestuff, obtained according to Example 32, finely dispersed in
7.5 g. of sodium alginate,
20 g. of triethanolamine,
20 g. of octylphenolpolyglycol ether, and
900 g. of water.

The fabric, squeezed out to ca. 100%, is dried at 100° and afterwards fixed during 30 seconds at a temperature of 210°. The dyed material is rinsed with water, soaped and dried. Under these conditions is obtained a deeply colored blueish-red dyeing having fastness to rubbing, light and sublimation.

The dyestuffs described in the other examples produce, with application of this process, dyeings of equal quality.

EXAMPLE 132

A mixture consisting of 1 g. of the dyestuff obtained according to Example 1 and 1 g. of the dyestuff, obtained according to Example 10, are dispersed in 4000 g. of water. To this dispersion are added, as swelling agent, 12 g. of the sodium salt of o-phenylphenol, as well as 12 g.

of diammonium phosphate, and 100 g. of yarn made from polyethylene glycol terephthalate are dyed for 1½ hours at 95–98°. The dyeing is rinsed and afterwards treated with aqueous sodium hydroxide solution and a dispersing agent.

In this manner is obtained a deeply colored red dyeing having fastness to light and to sublimation.

By replacing, in the above example, the 100 g. of polyethylene glycol terephthalate yarn by 100 g. of cellulose triacetic fabric, dyeing under the given conditions and subsequently rinsing with water, a deeply colored red dyeing is obtained having very good fastness to washing and to sublimation.

What is claimed is:

1. An anthraquinone dyestuff of the formula

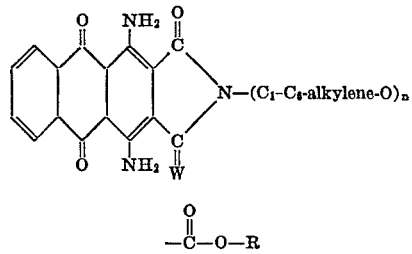

$$-\overset{O}{\underset{\|}{C}}-O-R$$

wherein R is $C_1$–$C_5$-alkyl, cyclohexyl, phenyl or phenyl optionally substituted by one or two substituents selected from $C_1$–$C_4$-alkyl, chlorine or $C_1$–$C_4$-alkoxy, $n$ is 1, 2 or 3 and W is =O or =NH.

2. An anthraquinone dyestuff as claimed in claim 1 wherein the alkylene group has a straight chain.

3. An anthraquinone dyestuff as defined in claim 1 and having the formula

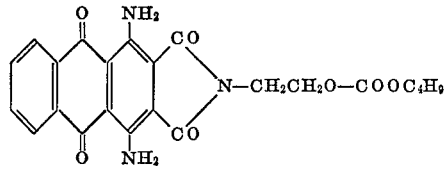

4. An anthraquinone dyestuff according to claim 1 wherein the alkylene group contains at most 4 carbons, and the phenyl group is substituted by one or two substituents selected from methyl, chlorine, or methoxy.

References Cited
UNITED STATES PATENTS 3,668,219    6/1972    Otsuka et al. _____ 260—325

JOSEPH A. NARCAVAGE, Primary Examiner

U.S. Cl. X.R.

8—39, 40; 260—207.1, 272, 325, 379.2, 347.2, 347.4, 370, 372, 375, 376, 377